US008305573B2

(12) United States Patent
Swiegers et al.

(10) Patent No.: US 8,305,573 B2
(45) Date of Patent: Nov. 6, 2012

(54) METHOD OF MONITORING AND CONTROLLING OF MIXING PROCESSES

(75) Inventors: Gerhard F. Swiegers, Vermont South (AU); Anton L. Launikonis, Coburg (AU); John Kraft, Newport (AU)

(73) Assignee: DataTrace DNA Pty Ltd, Frenchs Forest (AU)

( * ) Notice: Subject to any disclaimer, the term of this patent is extended or adjusted under 35 U.S.C. 154(b) by 680 days.

(21) Appl. No.: 11/990,712

(22) PCT Filed: Aug. 22, 2006

(86) PCT No.: PCT/AU2006/001209

§ 371 (c)(1),
(2), (4) Date: Jul. 28, 2009

(87) PCT Pub. No.: WO2007/022570

PCT Pub. Date: Mar. 1, 2007

(65) Prior Publication Data

US 2009/0303473 A1 Dec. 10, 2009

(30) Foreign Application Priority Data

Aug. 22, 2005 (AU) ................................ 2005904549

(51) Int. Cl.
*G01J 3/30* (2006.01)

(52) U.S. Cl. ........................................................ 356/317

(58) Field of Classification Search ................... 356/317
See application file for complete search history.

(56) References Cited

U.S. PATENT DOCUMENTS

| | | | | |
|---|---|---|---|---|
| 3,835,873 | A | 9/1974 | Wildpaner | |
| 5,527,706 | A | 6/1996 | Kroneis et al. | |
| 5,594,179 | A | 1/1997 | Marsh | |
| 5,674,698 | A | 10/1997 | Zarling et al. | |
| 6,060,318 | A | 5/2000 | Moeggenborg et al. | |
| 6,089,458 | A * | 7/2000 | Lake | 235/488 |
| 6,297,508 | B1 * | 10/2001 | Barmore et al. | 250/459.1 |
| 6,791,688 | B2 | 9/2004 | Lai et al. | |
| 2002/0136089 | A1 | 9/2002 | Folestad et al. | |
| 2004/0145620 | A1 * | 7/2004 | Strecker et al. | 347/20 |

FOREIGN PATENT DOCUMENTS

| | | |
|---|---|---|
| EP | 1 442 785 | 8/2004 |
| EP | 1 455 176 | 9/2004 |
| JP | 59-147626 | 8/1984 |
| WO | 02/01812 | 3/2002 |
| WO | 03/094679 | 11/2003 |

* cited by examiner

*Primary Examiner* — Kara E Geisel

(74) *Attorney, Agent, or Firm* — Nixon & Vanderhye P.C.

(57) ABSTRACT

A method for determining the degree of mixing between components in a mixing process, the method including the steps of: a) mixing at least two components and at least two luminescent materials to form a mixture, wherein the luminescent materials are added to the mixture separately from each other, and wherein each luminescent material has a uniquely detectable luminescence emission wavelength; b) detecting emitted luminescence from a sample of the mixture, wherein the emitted luminescence includes different luminescence intensities at the uniquely detectable luminescence emission wavelengths of the luminescent materials; c) wherein the ratio of luminescence intensities and/or the absolute or relative intensities of luminescence at the uniquely detectable luminescence emission wavelengths is indicative of the degree of mixing between the components.

14 Claims, 1 Drawing Sheet

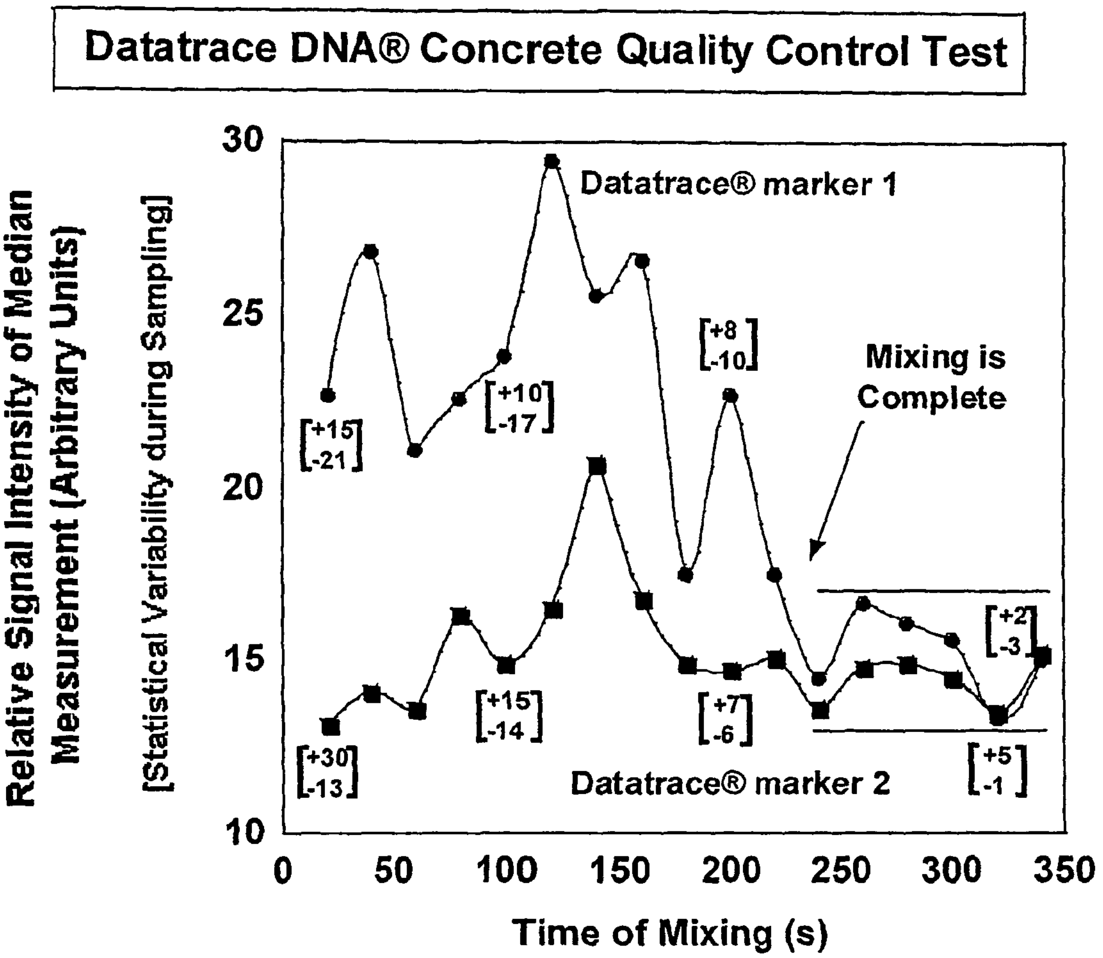
Datatrace DNA® Concrete Quality Control Test
Relative Signal Intensity of Median Measurement (Arbitrary Units)
[Statistical Variability during Sampling]
Datatrace® marker 1
Datatrace® marker 2
Mixing is Complete
[+15 -21]
[+10 -17]
[+8 -10]
[+2 -3]
[+30 -13]
[+15 -14]
[+7 -6]
[+5 -1]
30
25
20
15
10
0
50
100
150
200
250
300
350
Time of Mixing (s)

METHOD OF MONITORING AND CONTROLLING OF MIXING PROCESSES

This application is the U.S. national phase of International Application No. PCT/AU2006/001209 filed 22 Aug. 2006 which designated the U.S. and claims priority to Australian Patent Application No. 2005904549 filed 22 Aug. 2005, the entire contents of each of which are hereby incorporated by reference.

FIELD OF THE INVENTION

The present invention relates to a method for monitoring and controlling mixing processes. In particular, the method of the present invention relates to the use of luminescent materials in the process and quality control of industrial mixing operations.

BACKGROUND OF THE INVENTION

Mixing is a fundamental operation which is included in many commercial processes. For instance, mixing steps are often routinely used during the manufacture of industrial process materials, which are standardised, undifferentiated, substitutable, interchangeable, continuous or batch-processed in essentially identical form, and available in bulk or from a variety of sources. Examples of such materials include primary commodities, such as agricultural and mineral products, and processed commodities, such as manufacturing materials, building materials and industrial chemicals.

Where a commercial process involves a mixing step, the mixing operation is important in terms of process efficiency and ultimately product quality. In this regard some of the mixing related concerns of manufacturers include product consistency, process reproducability, scale-up/scale-down variations, as well as flexibility in process parameters and procedures. Being able to control these aspects often requires a good understanding of the underlying mechanisms and principles of the particular mixing process, which is often largely dependent on the properties of the components which are to be mixed. For instance, some properties which may affect solids mixing include particle-size distribution, bulk density, true density, particle shape, surface and flow characteristics, friability, moisture or liquid content of the solids and so on. For the mixing of liquids and liquid-solids, other properties such as liquid density, viscosity and surface tension come into play.

A need therefore exists for a method of measuring the degree of mixing between components in commercial mixing processes so as to enable the mixing processes to be monitored or optimised.

U.S. Pat. Nos. 4,442,017 and 4,238,384 disclose the incorporation of a fluorescence material to additives which are usually mixed with an organic polymer during the manufacture of polymeric thermoplastic materials. The patents purport to teach the addition of the fluorescence material as a way of monitoring the uniformity of distribution and/or the desired concentration of additives in the polymer mixture. These patents go some way to improving the quality control of thermoplastic polymer manufacture, however the method disclosed relies on the detection of the presence or absence of the fluorescence material as an indicator as to whether the additive or additives are present in the final polymer material or batch. In a multicomponent process which involves mixing, the quality of the manufactured product is often dependent on the degree of mixing of the components. Determining the presence or absence of a fluorescent material in a process does not offer a valuable insight into the -degree of such mixing. In this respect the present invention seeks to improve upon the shortcomings of the prior art.

SUMMARY OF THE INVENTION

A method for determining the degree of mixing between components in a mixing process, the method including the steps of:

a) mixing at least two components and at least two luminescent materials to form a mixture, wherein the luminescent materials are added to the mixture separately from each other, and wherein each luminescent material has a uniquely detectable luminescence emission wavelength;
b) detecting emitted luminescence from a sample of the mixture, wherein the emitted luminescence includes different luminescence intensities at the uniquely detectable luminescence emission wavelengths of the luminescent materials;
c) wherein the ratio of luminescence intensities and/or the absolute or relative intensities of luminescence at the uniquely detectable luminescence emission wavelengths is indicative of the degree of mixing between the components.

The ratio of luminescence intensities and/or the absolute or relative intensities of luminescence at the uniquely detectable luminescence emission wavelengths may be measured at a particular time or summed over a particular time interval after excitation and used to monitor or optimise the mixing process.

The luminescent materials may be added separately from each other at spaced-apart locations in the mixture or the mixing process, for instance, they may be added as part of different components of the mixture.

The sample of the mixture from which the emitted luminescence is detected may be a sample which is extracted from the mixture or a sample which is integral with the mixture.

BRIEF DESCRIPTION FIGURES

FIG. 1 depicts a graph of relative signal intensities of marker 1 and marker 2 (arbitrary units) vs time of mixing (seconds).

DESCRIPTION OF THE PREFERRED EMBODIMENTS

The present invention relates to a method for determining the degree of mixing in a process step wherein the process step comprises the mixing of at least two components. As such the method is amenable to be used in commercial product manufacture for a product composed of two or more components which are mixed in a single step or which involves multiple mixing operations. The components are preferably industrial process materials which are routinely used in the manufacture of other industrial process materials or may be used to prepare high-value articles.

As used herein the term “commercial process material” includes, but is not limited to the following classes of materials:

(a) Materials used for construction, including:
- Concrete
- Cement
- Timber
- Treated timber
- Clays and Clay Products Glass
Structural plastics and polymers
Decorative plastics and polymers
Sealing plastics and polymers
Composite materials
Ceramics
Metals and metal alloys
Gypsum
Bitumen
Asphalt and asphaltic concrete
Paint
Corrosion protection materials, such as paint
Silicon
Structural textiles (b) Materials used for structural and non structural applications in transportation vehicles, including motor vehicles, motorcycles, boats, air-transportation vehicles, and the like, such materials including:

Rubber, vulcanised rubber and their compounds
Silicon
Plastics
Composite materials
Epoxy
Ceramic materials and ceramic composites
Compounded materials such as, but not limited to, brake pads
Adhesive, glue, (vehicle) cement
Metal and metal alloys
Glass
Polycarbonate
Paints, undercoats and primers
Finishing products such as abrasive compounds, polishes and sealants
Antifouling materials and compounds
Low friction materials and compounds
Antistatic compounds
Lubricants
Cooling materials and compounds
Hydraulic fluids
Anti corrosion additives and compounds
Textiles (c) Materials used for industrial manufacturing of goods, components, clothing, and chattels, including:

Plastics and polymers and composites used as substrates for removable media such as, but not limited to memory cards and electronic chips
Plastics and polymers and composites used as base materials for computers, phones, batteries, and plastic utensils and components, toys
Glass
Composite materials for structural purposes
Epoxy
Glue
Ceramics
Semiconductors
Textiles (d) Materials used in the industrial manufacturing of computers and information technology-based items including:

Ceramics
Plastics
Polymers
Composite materials
Components such as circuit boards, processors and memory chips (e) Materials used for large-scale industrial packaging of goods, components, and chattels, including:

Paper
Cardboard
Plastics
Textiles (f) Materials used in primary and energy industries, including:

Bulk materials used as commercial commodity chemicals and commodity materials
Propellants
Energetic materials
Politically sensitive materials and chemicals
Cyanide
Precursor chemicals
Nuclear materials
Aggregates
Ores and processed and semi-processed ores
Ammonium nitrate
Other nitrates
Pesticide, herbicides and other potentially dangerous materials
Soil conditioners
Scrubbing agents
Mineral and agricultural commodities that are exchanged on commodity trading floors (g) Government regulated materials, including:

Pharmaceuticals and their precursors
Food additives and products
Cosmetics
Alcohol Thus from the list above it is evident that the method of the present invention is directed to manufacturing processes for materials, articles or products wherein the manufacturing process includes one or more mixing operations involving the mixing of two or more components which may be presented in solid or liquid form.

As used herein the term "luminescent material" refers to a material which displays fluorescence or phosphorescence (emission of light) as a result of a previous non-thermal energy transfer.

Examples of luminescent materials which may be used in the method of the present invention include:

(a) Luminescent organic materials including the following:

Aromatic and heteroaromatic monomers, such as pyrene, anthracene, naphthalene, fluorescein, coumarin, biphenyl, fluoranthene, perylene, phenazine, phenanthrene, phenanthridine, acridine, quinoline, pyridine, primulene, propidinium halide, tetrazole, maleimide, carbazole, rhodamine, naphthol, benzene, ethidium halide, ethyl viologen, fluorescamine, pentacene, stilbene, p-terphenyl, porphyrins, triphenylene, umbelliferone, and their derivatives, such as, 9-anthracenylmethyl acrylate, 2-naphthylacrylate, 9-vinylanthracene, 7-[4-(trifluoromethyl)coumarin] acrylimide, 2-aminobiphenyl, 2-aminopyridine, bis-N-methylacridinium nitrate, diacetylbenzene, diaminobenzene, dimidium bromide, methylpyrene, 2-naphthol, 3-octadecanoylumbelliferone, Fluorescent dyes known by trade names, such as Acid Yellow 14, Acridine Orange, Acridine Yellow G, Auramine O, Azure A and B, Calcein Blue, Coumarins 6, –30, –6H, –102, –110, –153, –480d, Eosin Y, Evans Blue, Hoechst 33258, Methylene Blue, Mithramycine A, Nile Red, Oxonol VI, Phloxine B, Rubrene, Rose Bengal, Unalizarin, Thioflavin T, Xylenol Orange, and their derivatives, such as Cresyl Violet perchlorate, 1,9-dimethylene blue, dodecylacridine orange bromide, and Polymers, such as fluorescent polyimides, like poly(pyromellitic dianhydride-alt-3,6-diaminoacridine), poly((4,4'-hexafluoroisopropylidene)diphthalic anhydride-alt-thionin), light-emitting conjugated polymers, like polyfluorenyls, polyacetylenes, polyphenylene ethynelenes, and polyphenylene vinylenes, light-emitting dopant functionalized polymers, such as poly(9-anthracenylmethyl methacrylate), poly[(methylmethacrylates-co-(fluorescein O-acrylate)], poly[(methylmethacrylates)-co-(9-anthracenylmethyl acrylate)], (b) Luminescent metal complexes including the following:

Metal complex emitters, such as zinc-, gold-, palladium-, rhodium-, iridium-, silver-, platinum-, ruthenium-, boron-, europium-, indium-, samarium-, and rare earth-complexes in general of a wide range of ligands, and their derivatives, such as bis(8-hydroxyquinolato)zinc, (2,2'-bipyridine)dichloropalladium(II), (2,2'-bipyridine)dichloroplatinum(II), chlorobis(2-phenylpyridine)rhodium(III), 8-hydroxyquinoline aluminium salt, lithium tetra(8-hydroxyquinolinato) boron, tris(dibenzoylmethane) mono(5-aminophenanthroline)europium(III), trichlorotris(pyridine)iridium(III). Other examples are provided in the following scientific papers: "*Ru(II) polypyridine complexes: photophysics, photochemistry, electrochemistry, and chemiluminescence*": Coordination Chemistry Reviews Volume: 84, March 1988, pp. 85-277; "*Metallated molecular materials of fluorene derivatives and their analogues*": Coordination Chemistry Reviews Volume: 249, Issue: 9-10, May, 2005, pp. 971-997; and "*Luminescent molecular sensors based on analyte coordination to transition-metal complexes*", Coordination Chemistry Reviews Volume: 233-234, Nov. 1, 2002, pp. 341-350, (c) Phosphors, including the following: (where the species below denote both doped, as well as undoped systems; that is, for example, CaS:Tb,Cl refers to CaS (undoped), CaS:Tb-doped, and CaS:Cl-doped, and where any one of the rare earths or common ions also denotes any of the rare earths and any of the common ions; that is, where, for example, CaO:Sm also denotes CaO:Eu, CaO:Dy, CaO:Tm, CaO:Ce, CaO:Pr, CaO:Nd, CaO:Ho, CaO:Er, CaO:Tb, CaO:Gd, CaO:Yb, CaO:V, CaO:Mn, CaO:$UO_2$, CaO:Cr, CaO:Fe, and so forth (where Pr, Nd, Sm, Eu, Dy, Ho, Er, Tb, Gd, Tm, Yb are examples of rare earths, and V, Mn, $UO_2$, Cr, Fe are examples of other common ions)

Oxides, such as CaO:Eu, CaO:Eu,Na, CaO:Sm, CaO:Tb, $ThO_2$:Eu, $ThO_2$:Pr, $ThO_2$:Tb, $Y_2O_3$:Er, $Y_2O_3$:Eu, $Y_2O_3$:Ho, $Y_2O_3$:Tb, $La_2O_3$:Eu, $CaTiO_3$:Eu, $CaTiO_3$:Pr, $SrIn_2O_4$:Pr,Al, $SrY_2O_4$:Eu, $SrTiO_3$:Pr,Al, $SrTiO_3$:Pr, Y(P,V)$O_4$:Eu, $Y_2O_3$:Eu, $Y_2O_3$:Tb, $Y_2O_3$:Ce,Th, $Y_2O_2S$:Eu, (Y,Gd)$O_3$:Eu, $YVO_4$:Dy, Silicates, such as $Ca_5B_2SiO_{10}$:Eu, $Ba_2SoO_4$:Ce,Li,Mn, $CaMgSi_2O_6$:Eu, $CaMgSi_2O_6$:Eu/Mn, $Ca_2MgSi_2O_7$:Eu/Mn, $BaSrMgSi_2O_7$;Eu, $Ba_2Li_2Si_2O_7$:Sn, $Ba_2Li_2Si_2O_7$:Sn,Mn, $MgSrBaSi_2O_7$:Eu, $Sr_3MgSi_2O_8$:Eu,Mn, $LiCeBa_4Si_4O_{14}$:Mn, $LiCeSrBa_3Si_4O_{14}$:Mn, Halosilicates, such as $LaSiO_3Cl$:Ce,Th, Phosphates, such as $YPO_4$:Ce,Th, $YPO_4$:Eu, $LaPO_4$:Eu, $Na_3Ce(PO_4)_2$:Tb, Borates, such as $YBO_3$:Eu, $LaBO_3$:Eu, SrO.3$B_2O_3$:Sm, $MgYBO_4$:Eu, $CaYBO_4$:Eu, $CaLaBO_4$:Eu, $LaALB_2O_6$:Eu, $YAl_5B_4O_{12}$:Eu, $YAl_5B4O_{12}$:Ce,Th, $LaAl_3B4O_{12}$:Eu, $SrB_8O_{13}$:Sm, $CaYB_{0.8}O_{3.7}$:Eu, (Y,Gd)$BO_3$:Tb, (Y,Gd)$BO_3$:Eu, Aluminates and Gallates, such as $YAlO_3$:Eu, $YAlO_3$:Sm, $YAlO_3$Tb, $LaAlO_3$:Eu, $LaAlO_3$:Sm, $Y_4Al_2O_9$:Eu, $Y_3Al_5O_{12}$:Eu, $CaAl_2O_4$:Tb, $CaTi_{0.9}Al_{0.1}O_3$:Bi, $CaYAlO_4$:Eu, $MgCeAlO_{19}$:Tb, $Y_3Al_5O_{12}$:Mn, Miscellaneous oxides, such as $LiInO_2$:Eu, $LiInO_2$:Sm, $LiLaO_2$:Eu, $NaYO_2$:Eu, $CaTiO_3$:Pr, $Mg_2TiO_4$:Mn, $YVO_4$:Eu, $LaVO_4$:Eu, $YAsO_4$:Eu, $LaAsO_4$:Eu, $Mg_8Ge_2O_{11}F_2$:Mn, $CaY_2ZrO_6$:Eu, Halides and oxyhalides, such as $CaF_2$:Ce/Tb, $K_2SiF_6$:Mn, YOBr:Eu, YOCl:Eu, YOF:Eu, YOF:Eu, LaOF:Eu, LaOCl:Eu, $(ErCl_3)_{0.25}(BaCl_2)_{0.75}$, LaOBr:Tb, LaOBr:Tm, CaS-type sulfides, such as CaS:Pr,Pb,Cl, CaS:Tb, CaS:Tb,Cl, Miscellaneous sulfides and oxysulfides, such as $Y_2O_2S$:Eu, $GdO_2S$:Tb, $Na_{1.23}K_{0.42}Eu_{0.12}TiSi_5O_{13}$:$xH_2O$:Eu, "Up-convertes"; that is, compounds that emit photons of higher energy than they absorb, such as $NaYF_4$:Er,Yb, $YF_3$:Er,Yb, $YF_3$:Tm,Yb.

(d) Quantum-dots; these being nanoparticulate materials whose luminescent properties are dependent on their particulate size, such as gold and other metal nanoparticles.

The luminescent materials used in the method of the present invention are those which provide a unique luminescent response which can be quantified. Such luminescent materials may be chosen by taking advantage of unique excitation or emission frequencies and intensities, or other unique properties of their luminescence, such as an extended duration of luminescence.

In the case where the present invention relies on being able to track the relative ratio of the emission intensities of two or more luminescent materials, the following limitations apply. For each luminescent material, the overall intensity of the luminescent glow is determined by three physical variables: (i) the extent to which the irradiated light is absorbed by the luminescent material (the so-called absorption coefficient at the frequency of irradiation); (ii) the "quantum efficiency" with which the absorbed light is retransmitted at the emission frequency by the luminescent material; and (iii) the "luminescence half-life" of the luminescent material; i.e., the time required before the luminescent glow diminishes to one half of its original intensity. As each luminescent material displays different values for each of (i) to (iii), it will generally be necessary to employ different concentrations of each luminescent material to ensure that comparable intensities are achieved within the final mixture using the detection system employed. Additionally or alternatively, the conditions of irradiating the luminescent materials or of detecting the emissions produced by the luminescent materials may be varied. Or they may be chosen such that the emission intensities are measured only at a particular time or time interval following the end of an irradiation pulse in a technique known to those in the art as "gating". In such cases, it is generally preferable to use luminescent materials having long durations of luminescence, since such materials are likely to luminesce after background luminescence by the materials to be mixed has ended, thereby eliminating this background luminescence from the observed data.

As luminescent materials are rarely involved in manufacturing processes, their natural presence in components used in industrial product manufacture (e.g. industrial process materials) is negligible. Also, as most industrial components generally do not display substantial or long-lived luminescence, the unique luminescent response which is conferred by the added luminescent materials is unlikely to be affected by the presence of other luminescent behaviour. In this way the addition of the luminescent materials according to the method of the present invention may be used to confer a unique identity to the components of a mixture.

For instance, in a mixing operation which involves the mixing of two components A and B, a luminescent material C which has a unique emission spectra and intensity under the irradiation and measurement conditions employed may be added to component A and mixed prior to component A being mixed with component B. Likewise, component B may be prior mixed with a luminescent material D which has its own unique emission spectra and intensity that is different from that of luminescent material C under the irradiation and measurement conditions employed. In this way the unique luminescent response of material C is conferred to component A and the unique luminescent response of material D is conferred to component B. Thus, the subsequent mixing of components A and B can be monitored in real time such that the degree of mixing, at any one instant, over the mixing operation, can be determined by measuring and comparing the relative ratios of the intensities of luminescent materials A and B. The concentrations of luminescent material C in component A and of luminescent material D in component B can be so designed that the final product containing A and B in an optimally mixed combination will display intensities of A and B that have a definite, pre-determined ratio.

The advantage of correlating the mixing efficiency with a desired ratio of the emission intensities of A and B is that these intensities can only be correct in randomly sampled batches of the final mixture if they are also correct in all other such randomly sampled batches. This is because an over abundance or an under abundance in one part of the mixture must necessarily reflect the corresponding, opposite condition in another part of the mixture. Thus, in the example above, a relative overabundance of luninescent material C in one random sample must be accompanied by an under abundance of luminescent material D in that sample. The error in mixing is then quantified as the difference between the actual and the expected intensities for each of C and D, and the difference in the expected and the actual ratio of C:D. The latter ratio gives a very sensitive and quantifiably accurate measure of the mixing efficiency over the entire consignment since an error in C is necessarily magnified by a corresponding error in D.

By contrast, in the methods cited in U.S. Pat. Nos. 4,442,017 and 4,238,384, only one luminescent material is employed, so that the efficiency of mixing can only be determined by measuring the variation in the emission intensity over many randomly sampled batches from the expected average emission intensity. In this method, errors in the mixing efficiency are not magnified as above and are therefore less sensitive to the actual mixing efficiency. Moreover, to ensure proper mixing, one must collect and measure many more random samples.

It will be appreciated that in some embodiments of the present method it may not be necessary to confer an identity to each component by adding a luminescent material. Also, some applications may necessitate conferring an identity to a component by the addition of more than one luminescent material to the component.

As the luminescent materials are used in the present method as indicators of the degree of mixing of the components, the method of the present invention can be performed in various ways so long as the luminescent materials are added to the components separately, that is, they are not themselves added as mixtures or added at the same point where a subsequent detection sample is to be taken.

Accordingly, in a preferred embodiment, as detailed above, the luminescent materials are separately added to each of the components and mixed prior to combining and mixing the components. Alternatively, the luminescent materials are just added to the components prior to combining and mixing the components.

In a further embodiment, the luminescent materials may be added separately to the components during the mixing operation. As highlighted above, when this is done, careful attention should be taken so as not to mix the luminescent materials prior to their addition with the components or adding them at the same point where a subsequent detection sample is to be taken. In relation to this latter point, the present method envisages the addition of the luminescent materials separately from each other at spaced-apart locations to the component mixture. When this is done, preferably the detection sample is taken at a point between the locations where the luminescent materials are added.

The invention also envisages the use of the present method for determining the degree of mixing of multiple mixing operations in a single manufacturing process. For instance, a third component may be required to be added after pre-mixing two components. The present invention can be used to determine the degree of mixing of the first two components prior to adding the third. Also, if a different luminescent material is added with the third component, the degree of mixing of the third component can also be determined.

As the luminescent materials are to be used in the present method for the purposes of monitoring a mixing operation, the luminescent materials are suitably selected such that they do not adversely affect the physical properties or react with the components either during the mixing operation or upon manufacture of the industrial product, i.e. either during further processing, storage, transport or during use of the product.

Preferred luminescent materials are those which do not degrade easily and therefore can be detected after being subjected to the processing conditions. Examples of preferred luminescent materials include lamp and cathode ray tube phosphors, and in particular, rare-earth-doped phosphors. The luminescence properties of these phosphors degrade extremely slowly over time and are relatively stable so that they can be reliably and reproducibly detected over extended periods of time (for example, 25-50 years) and can be subjected to a variety of process conditions.

To ensure that the luminescent materials remain inert with respect to the processing conditions the luminescent materials may be chemically or physically modified. For instance, the luminescent materials may be physically encapsulated within a covering sheath. The sheath may be composed of a polymer, such as a methylmethacrylate, polypropylene, polyethylene, or polystyrene or a wax such as paraffin wax, bees wax, gel wax, vegetable wax or the like. Methods of encapsulating luminescent materials with polymers and waxes are known in the art.

In some instances it may be preferable to modify the components such that the luminescent material becomes intimately associated with a particular component. For instance, the luminescent material may be coated on the surface of a component or incorporated within the component in a process step preceding a mixing operation.

Accordingly, before being subjected to mixing, one or more of the luminescent materials may be incorporated into or on a component by physical incorporation and/or chemical incorporation. For example, physical incorporation may involve the physical trapping of luminescent dye molecules, particles, or aggregates, within the structure or structural make-up of a component.

Chemical incorporation may involve the creation of an attractive interaction between luminescent dye molecules, particles, or aggregates and the component itself.

The luminescent materials are added in detectable amounts. Preferably, due to the cost associated with many of the available luminescent materials, the use of trace amounts of these materials, especially in conjunction with low cost industrial process materials, is financially beneficial and desirable. As used herein, the term "trace amount" refers to an amount of the luminescent materials which is not optically detectable in the presence of ambient light. Preferably, the trace amount is between 1 part per billion and less than 0.1% by mass of the total components. If the method is to be used to monitor the degree of mixing in a manufacturing process which involves multiple mixing steps and the addition of multiple components at various steps during the process, then the amount of luminescent materials employed may be increased in anticipation that the luminescent materials may be diluted in the course of the manufacturing process. Accordingly, the amount of luminescent materials added in the method of the present invention will depend both on processing strategies and the nature of the components.

Preferably, the amount of the total luminescent materials which are subjected to the present method will not cause the components or mixture of components (or products derived therefrom) to fluoresce or phosphoresce. Accordingly, while the luminescent materials may be detectable once mixed, they do not provide the component, mixture of components (or products derived therefrom) with any visual identity when observed by the naked eye. As such, preferably the presence of the luminescent materials does not affect the normal physical appearance of the components.

The luminescent response of the luminescent materials which are subjected to the method of the present invention can be detected by conventional spectral apparatus. For instance, the availability of a wide range of fluorescence spectrophotometers makes quantitative measurements possible. Most often the detection may require the removing of a sample or samples of the mixture which is to be placed in a spectrophotometer. In this manner the detection is typically done in a laboratory setting. However, recent advances in electronics, optics, and computing allows for the production of portable spectrometers which possess sensitivities capable of detecting trace amounts of luminescent materials in samples. Furthermore, portable spectral readers are available which allow for non-invasive field detection without damaging the product. This may involve running the probe of a reader along a surface of a product or immersing the probe in a sample mixture. Accordingly, in this manner sampling can be done over an entire surface or different points of a surface or within particular locii within a mixture.

For instance, a portable reader for detecting trace amounts of luminescent materials in the field or on-site, may include a portable spectrometer and a portable light source optically connected to a probe which is adapted to bi-directionally transmit light between the light source, the spectrometer and the sample while excluding ambient light.

For field or on-site monitoring of mixing, a portable detection system may include:

i) a portable light source and a portable spectrometer operatively connected to a portable computer;

ii) a portable fibre optic probe optically connected to the light source and the spectrometer at one end and having a tip at the other end which is configured to occlude ambient light from a sample; and iii) computer software executable by the portable computer for controlling the light source and the spectrometer to non-destructively optically detect a trace amount of a luminescent material in the sample when ambient light is occluded therefrom by the probe tip.

The system may further include computer software executable by the portable computer to determine ratios of the luminescent response of the luminescent materials.

As used herein the phrase "degree of mixing" refers to a measure of the spatial and/or physical distribution of the components in a mixture of said components.

In order to monitor the degree of mixing of the components, the unique luminescent response of each of the added luminescent materials under the conditions of reading employed is detected for each of the luminescent materials in a sample. The individual responses are referenced against each other in order to derive a relative ratio of the luminescent materials within the sample. The ratio between the materials represents the relative differences in the luminescent response of each of the luminescent materials before and after mixing. For instance, two luminescent materials (A and B) may each separately be added in the same amounts to two different components which are to be mixed. Each of the luminescent materials displays a unique emission spectrum and is incorporated at levels such that they display the same intensity levels for their respective emissions under the conditions of reading employed. After mixing for a certain time a sample of the mixture is taken and the intensity of luminescent material A is determined to be 50% and the intensity of luminescent material B is determined to be 25% under the conditions of reading employed. The degree of mixing of the components may be viewed from this ratio of A:B (1:0.5) as being, at least, only half complete. In a system as described above, an identified ratio of A:B which is 1:1 would be indicative that the mixing has reached relative homogeneity.

It will be appreciated that in some mixing operations the creation of a homogeneous mixture may not be necessary. One of the advantages of the present method is that it provides the artisan with the means for determining the degree of mixing so that the importance and implications of non-uniform mixing can be determined. Industries that produce materials that require mixing (such as the concrete industry), typically rely on the rated times provided by the manufacturers of mixing equipment to determine the mixing time for each batch. The rated mix times are, however, very crude measures that do not and can not take into account every possible variation of materials, mix design and batch size that may be used with any given piece of equipment.

Therefore, for certain combinations of materials and batch sizes, individual batches may continue to be mixed for extended periods of time, say well after homogeneity has been achieved, thereby causing inefficiency in production to occur. Alternatively, for certain combinations of materials and batch sizes, mixing may well be stopped before homogeneity has been achieved, resulting in poor quality. The present invention provides embodiments which may address both these problems.

Additionally or alternatively, the preferred embodiments of the present invention provide a means of establishing a new optimized mixing procedure for a particular combination of materials, or a new batch size, or a new mix design. In this manner, not every batch is monitored, but a trial is conducted to determine when homogeneity can be typically expected to occur for a given mixture. The ease of use of the new method means that it is a simple matter to monitor the first few mixes to establish when homogeneity typically occurs for a given combination of batch size, mix design and piece of equipment.

In a still further embodiment, the method provides a quick and simple means of quality control, where the quality of mixing is important and perhaps critical to the performance of the final product. As some of the current methods of measuring homogeneity are typically slow and laborious (for instance, in concrete production), they cannot practically be used in field operations (or even in production where a prompt method of ascertaining or measuring homogeneity is required). The method of the present invention provides an efficient means to ascertain that a mix has achieved homogeneity which is easy to use in the field and also in time-conscious production environments.

Certain embodiments of the present invention may also advantageously serve as a means for identifying or marking a specific product which has been produced through a unique mixing operation. As such, the quality of the product can be associated with a particular manufacturer and mixing process.

It will be appreciated by those skilled in the art that the present invention may also be employed in different embodiments in order to achieve different objectives.

Other more specific applications of embodiments of the present invention are detailed as follows:

(a) For Concrete

Concrete is an industrial process material whose quality is very much reliant on the mixing of its components. Concrete is generally made up of cement, coarse and fine aggregates and water. Typically, mixing is performed for a set time according to the manufacturer's specifications. For example, ready-mix concrete of the type used to build bridges, roads and the like, is typically prepared and mixed in a motorized cement mixer of approximately 7,000 litres, set atop the back of a suitably modified truck. The standard protocol for mixing such concrete typically involves mixing it at designated speed for a set number of revolutions or for a set time (typically 4 minutes).

In general it can be said that the optimum mixing time of concrete varies according to the amounts of the components (the size of the load) and the "mix design" (which incorporates variations in the ratios and nature and type of the components used and the design of the mixer itself).

To date, there is no available system to measure homogeneity that can be routinely used by the manufacturers of ready-mix concrete in their operations. This means that the manufacturer of ready-mix concrete is forced to use a default value for the mixing time, without allowing for variation in the size of the load or the type of materials used or in the relative ratios of the materials used. This results in non-optimum mixing; either the loads are mixed for too long, which slows production, or the loads are mixed for too short a period, leading to possible future product failure.

In addition, normal variation (within usual tolerances), be it controlled or uncontrolled, can cause the optimum mixing time to change. For example, the moisture content of the components may have an important effect on the optimum mixing time. Such changes are non-linear, meaning that the optimum mixing time cannot be readily extrapolated from the manufacturers recommended time. Indeed, even small variations in any one of the variables cause the optimum mixing time to change in a non-predictable way. In order to overcome such deficiencies, the present method provides a quick and efficient way of measuring the homogeneity of mixing and thereby establishing the optimum mixing time for different load sizes and different mix designs.

According to the present invention a method of determining suitable mixing in a concrete or cement-based sample may include the introduction of two or more luminescent materials: one into one component, such as the sand or fine aggregate portion, and the other into another component, such as the cement portion. The intensities of the signals received may then be compared relative to each other in order to establish how well the sample has mixed. For example, if the luminescent materials are introduced into their respective components in quantities such that they will display identical amplitudes of the respective emissions when perfectly mixed, then mixing of the concrete or cement-sand must proceed until such a stage as their respective measured emission amplitudes are identical with respect to one another. Only at that stage is the overall sample uniformly mixed.

(b) For Pharmaceutical Manufacture

Administerable pharmaceutical doses usually require precise amounts of active ingredients. This can only be achieved by homogeneous mixing with the adjuvants and/or excipients and ensuring that the ratios of active to non-active ingredients remains uniform in the unit dose which is to be administered. This process can be quite difficult for very potent active ingredients which require small amounts of the active to be mixed with relatively large amounts of adjuvants and/or excipients. By applying amounts of pharmacologically acceptable luminescent materials during the mixing step, in accordance with the present method, accurate dosage amounts can be determined easily at a batch level and also at a unit dose level, for example, in a tablet.

(c) For Polymer Manufacture

During the manufacture of thermoplastic polymers, a polymeric resin is often mixed with a variety of additives such as catalysts, pigments, stabilizers, lubricants, etc. The distribution of the additives, which may vary greatly, can adversely affect the quality of the resulting polymeric material. By applying separate luminescent materials to each of the additives according to the method of the present invention, a manufacturer is able to monitor the degree of mixing of the components, and if required, adjust the processing parameters accordingly.

It will be appreciated by those skilled in the art that the present invention may also be employed in different embodiments in order to achieve different objectives. For example, the method may be used to verify the homogeneity of every individual mixing operation within an industrial process. The method may be used to provide a continuous output of the degree of homogeneity of a mixing process. Thus, as soon as homogeneity has been achieved, the mixing process can be stopped and the batch moved into the next production stage. Used in this manner the method provides for a means to minimize production times and to maximize production efficiency.

The invention will now be described in the following Example. The Example is not to be construed as limiting the invention in any way.

EXAMPLE

Two distinctive luminescent markers were introduced into the formulation of a standard trial mix of production grade concrete in a WESTMIX 2.2 Cubic foot cement mixer operating at 18 revolutions per minute. Marker 1 (1 g) was introduced with the water as the first solid component in the mix. Then gravel (7.5 kg), sand (7.5 kg) and cement (5 kg) were added in that order to the cement mixer, as per standard mixing instructions. Marker 2 (1 g) was then added and the mixture was mixed for 4 minutes at maximum revolutions.

During the mixing period, the maximum emission intensities of each of the markers, relative to the baseline, were sampled at random positions at the top of the mix every 20 seconds using a suitable portable reader of the type described above. During the sampling process up to 20 measurements were taken. The median datapoint was calculated and the statistical scatter of the data (that is, the range of the data) during the sampling measurements was also determined.

The markers were rare-earth phosphors of the types described above; each phosphor emits a series of wavelengths of light when illuminated with ultra-violet light of wavelength 250 nanometres. Thus, when irradiated with light of wavelength 250 nm, marker 1 emits light of wavelength 580 nanometres (nm), 620 nm, and 700 nm, while marker 2 emits at 490 nm and 575 nm. The emission wavelengths of the markers therefore do not overlap with each other.

According to the monitored emission intensities shown in FIG. 1, the mixture became homogeneous after approximately 3 minutes, when the median emission maxima registered their expected intensities simultaneously. This is only possible if the mixture is perfectly homogeneous. In the following mixing time, it remained homogeneous.

Additionally, the statistical scatter of the data during the sampling became smaller continuously until approximately 3 minutes, confirming that homogeneity in the mixture had been established. The statistical scatter is indicated in FIG. 1 as the numbers in square brackets shown at selected data points. These numbers indicate the range of the maximum intensity data during these particular sampling measurements. After 3 minutes both the absolute and relative maximum intensities of the marker emissions and their statistical scatter remained invariant. As such, the statistical scatter provides an additional, confirming metric with which to gauge the homogeneity of the mixture. This measure can be used as a primary or as a secondary metric. That is, the homogeneity of the mixture can be measured by integrating over time the scatter of the data during sampling. When the change in this scatter becomes zero per unit time, the mixture is homogeneous.

The standard method of determining homogeneity is Australian standard test number AS1141 entitled 'Methods of Sampling and Testing Aggregates'. This technique involves taking a sample of the material, washing out the cement fractions of the mix with water, and then sorting the sample into size gradings of −4.75 mm and +4.75 mm. The amount of material derived from each of the sortings is then compared to the mix design of the concrete and to the other samples taken from the mix. The allowable variation is ±3%. It will be appreciated that the method of Australian Standard (AS) 1141, as a standard method of determining homogeneity, is slow and labour intensive. Furthermore, it is apparent that AS1141 is wholly unsuitable as a method of determining homogeneity in the field. As a result, it is rarely performed in the laboratory (and, effectively, never in the field).

The present invention improves drastically upon AS1141 since it provides multiple metrics which are measurable in real-time for determining homogeneity. These metrics not only agree as to when the mix has achieved homogeneity, but the method of the present invention is more specific in this respect because of the greater number of data-points available; this is, in turn, possible because of the greater ease of measurement.

Throughout this specification, unless the context requires otherwise, the word "comprise" and variations such as "comprises" and "comprising" will be understood to imply the inclusion of a stated integer or step or group of integers but not the exclusion of any other integer or step or group of integers.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method for determining the degree of mixing between components in a concrete mixing process, the method including the steps of:

a) mixing at least two components and at least two luminescent materials to form a concrete mixture, wherein the luminescent materials are added to the mixture separately from each other, and wherein each luminescent material has a uniquely detectable luminescence emission wavelength;

b) detecting emitted luminescence from a sample of the mixture, wherein the emitted luminescence includes different luminescence intensities at the uniquely detectable luminescence emission wavelengths of the luminescent materials;

c) wherein the ratio of luminescence intensities and/or the absolute or relative intensities of luminescence at the uniquely detectable luminescence emission wavelengths is indicative of the degree of mixing between the components of the concrete mixture, wherein the luminescent materials are independently selected from a luminescent metal complex or an inorganic phosphor that emits phosphorescence.

2. A method according to claim 1 wherein the luminescent materials are added to the concrete mixture separately from each other as part of different components of the mixture.

3. A method according to claim 2 wherein the luminescent materials are separately added to the components of the concrete mixture and mixed prior to combining and mixing the components.

4. A method according to claim 1 wherein the luminescent materials are added separately from each other at spaced-apart locations in the concrete mixture during the mixing of the components.

5. A method according to claim 4 wherein the detecting step b) involves taking the sample at a point between the locations where the luminescent materials are added.

6. A method according to claim 1 wherein the sample of the mixture from detecting step b) is extracted from the mixture.

7. A method according to claim 1 wherein the sample of the mixture from detecting step b) is integral with the mixture.

8. A method according to claim 1, wherein the luminescent materials are characterized with emission wavelengths that do not overlap with each other.

9. A method according to claim 1, wherein the luminescent materials are rare-earth doped inorganic phosphors.

10. A method according to claim 1 wherein the luminescent materials are present in the mixture at between 1 part per billion and less than 0.1% by mass of the total components.

11. A method according to claim 1 wherein detecting step b) is performed using a portable detection system.

12. A method according to claim 11 wherein the portable detecting system comprises: i) a portable light source and a portable spectrometer operatively connected to a portable computer; ii) a portable fibre optic probe optically connected to the light source and the spectrometer at one end and having a tip at the other end which is configured to occlude ambient light from a sample; and iii) computer software executable by the portable computer for controlling the light source and the spectrometer to non-destructively optically detect a trace amount of a luminescent material in the sample when ambient light is occluded therefrom by the probe tip.

13. A method according to claim 1 wherein the mixing step a) involves two components of the concrete mixture each comprising a different rare-earth doped inorganic phosphor which has been added to the components prior to the components being mixed to form the concrete mixture.

14. A method according to claim 13, wherein the detecting step b) is performed using a portable detection system and wherein the sample is integral with the mixture.

* * * * *